May 23, 1967   E. W. CHRISTEN   3,321,245
SELF-RETRACTING SEAT BELT

Filed Nov. 12, 1965   2 Sheets-Sheet 1

INVENTOR.
Eugene W. Christen
BY
Paul Fitzpatrick
ATTORNEY

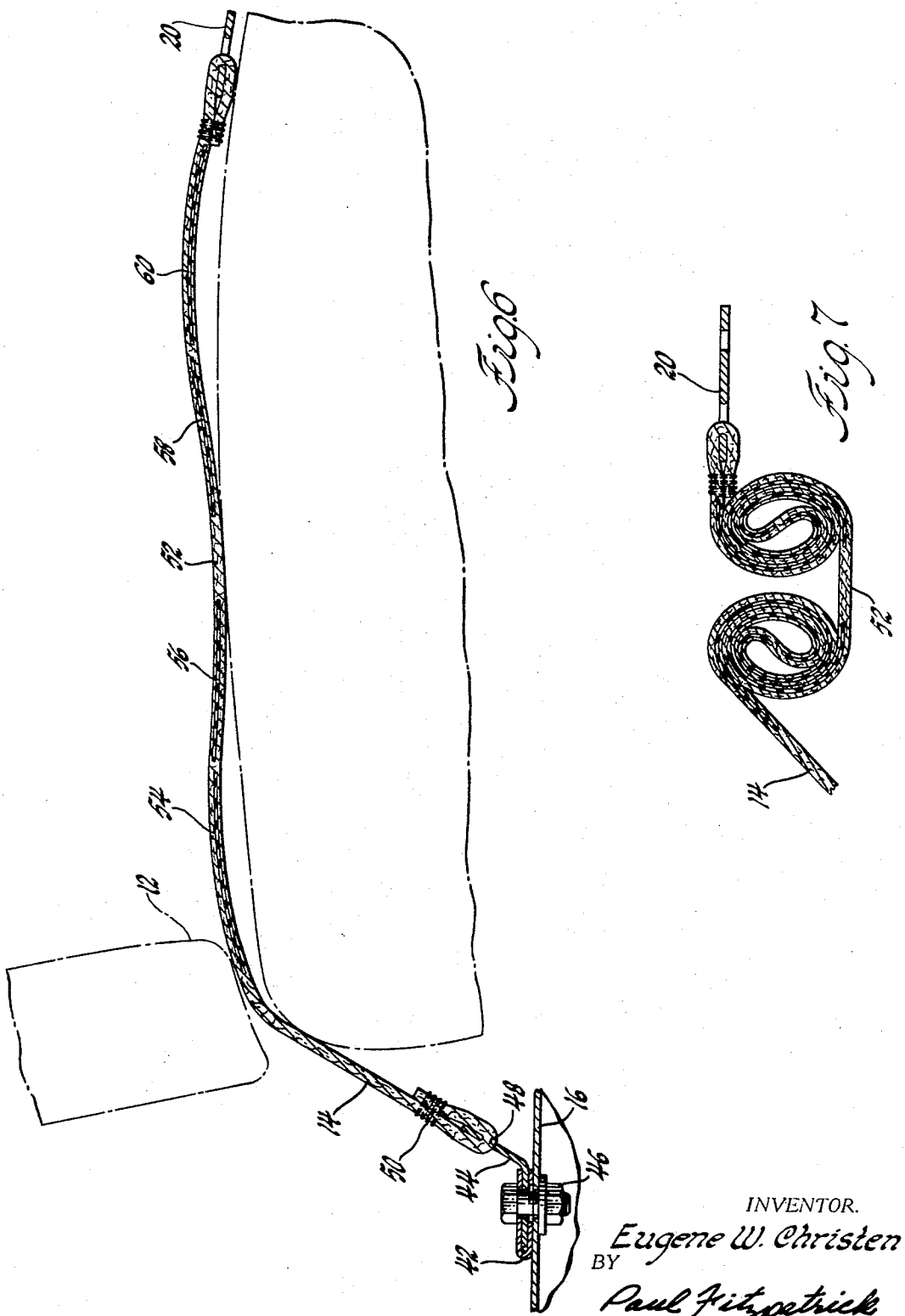

United States Patent Office 3,321,245
Patented May 23, 1967

3,321,245
SELF-RETRACTING SEAT BELT
Eugene W. Christen, Birmingham, Mich., assignor to General Motors Corporation, Detroit, Mich., a corporation of Delaware
Filed Nov. 12, 1965, Ser. No. 507,273
1 Claim. (Cl. 297—388)

This invention relates to safety seat belts, particularly one which is self-retracting.

The use of seat belts in vehicles without retractors results in a very untidy and unkempt appearance as the seat belts normally are left lying either on the vehicle seat or on the floor. Therefore, many different types of retracting mechanisms have been used to retract the seat belt, when not in use, to a position which improves the appearance and tidiness of the vehicle. Most retractor mechanisms known heretofore involve a complicated mechanical structure located either adjacent to the floor anchorage or on the side of the seat and involve a number of working parts. Such retractor systems, in addition to being bulky and complicated, are also expensive, thereby substantially increasing the cost of a safety seat belt assembly in a vehicle.

It is, therefore, an object of this invention to provide a safety seat belt assembly for an automobile which is self-retracting and eliminates the need for a separate retractor mechanism.

Other objects, features, and advantages of the subject invention will become apparent upon reference to the succeeding detailed description of the preferred embodiments of the invention and the drawings thereof wherein:

FIGURE 6 is a sectional view of another embodiment of this invention in the fully extended position; and FIGURE 7 is a sectional view of the belt of FIGURE 6 in the retracted position.

In general the invention comprises a safety seat belt having oppositely prestressed elements connected thereto or contained therein which cooperate to self-wind the seat belt strap into at least one compact roll upon its release by the user.

Figure 1:
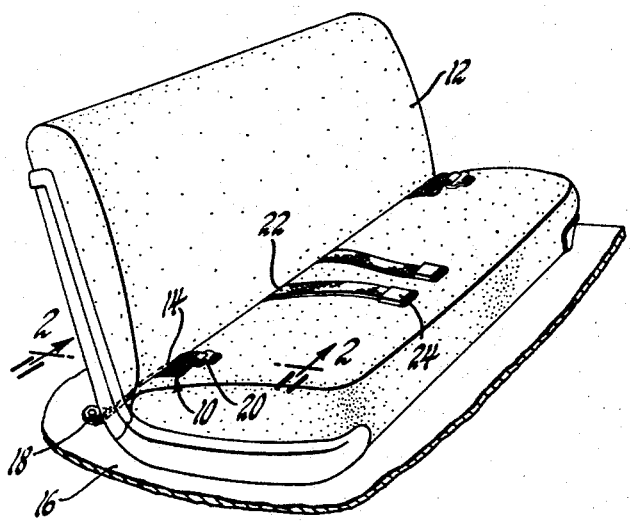
FIGURE 1 is a perspective view of a self-retracting safety belt embodying this invention as used on an automobile seat.

More particularly, FIGURE 1 shows the subject self-retracting seat belt assembly 10 as used in conjunction with a vehicle seat 12. As shown in FIGURE 1 the seat belt assembly 10 includes a belt 14 which is anchored at one end to the floor pan 16 by a suitable anchorage 18 and connects to a latch plate 20 at its other end. A companion seat belt 22 connects to a seat belt buckle 24 at one end and is likewise anchored to the floor pan 16 at its other end. The seat belts 14 and 22 then combine to form a seat belt assembly for securement of one user. The other pair of seat belts shown are identical to those described.

Figure 2:
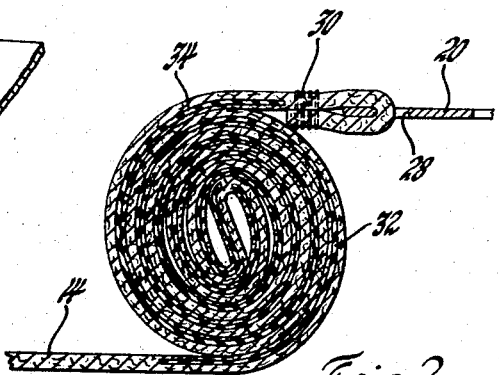
FIGURE 2 is a sectional view of a retracted safety belt in the plane of lines 2—2 in FIGURE 1.
Figure 3:
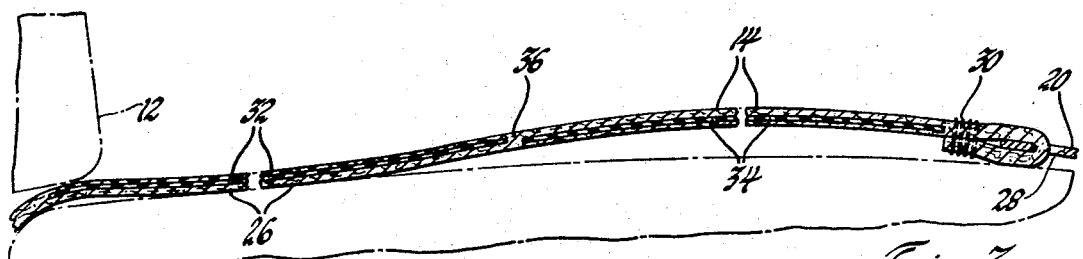
FIGURE 3 is a sectional view of the safety seat belt of this invention in the non-retracted position.

The belt 14, which is attached to the latch plate 20, is shown in its retracted position in FIGURE 2. As shown in FIGURE 3 the belt 14 is made primarily of a fabric material 26. This fabric material 26 may be of any suitable type (preferably woven), non-elastic in character and having suitable strength characteristics to withstand the forces applied to the belt while in operation. The belt 14 is attached to the latch plate 20 by having its end pass through an aperture 28 in the latch plate 20 and be sewn to itself as shown at 30. The belt 14 shown in FIGURE 3 includes a pair of elastic members 32 and 34. The elastic members 32 and 34 may be of any suitable elastic material such as a rubber compound. In the FIGURE 3 embodiment the elastic members 32 and 34 are locked within the woven structure of the fabric material 26. The elastic member 32 is placed within the fabric 26 near its upper surface, and the elastic member 34 is spaced longitudinally from the elastic member 32 and placed within the fabric 26 near its lower surface. Both elastic members 32 and 34 are placed in a prestressed condition in tension. These elastic portions thus place opposite bending moments on the belt 14 thereby causing the belt to roll into the pattern shown in FIGURE 2. It should be noted that if one continuous elastic member is used throughout the whole length of the belt 14 it tends to roll up at its outer end so that the latch plate 20 would wind up near the center of the resulting roll of the belt. However, in this embodiment the use of two prestressed elastic members near opposite edges of the belt results in a folding of the belt at the portion 36 between the elastic members 32 and 34. This folding of the belt 14 at the location 36 and the opposite bending moments created by the elastic members 32 and 34 results in a double rolling effect such that the member 32 tends to rotate the belt 14 upwardly and the elastic portion 34 tends to rotate the belt downwardly. Thus, the winding pattern shown in FIGURE 2 results whereby the lock plate 20 remains on the outside of the wound-up belt and the interior length of the belt effectively is wound upon itself.

Figure 4:
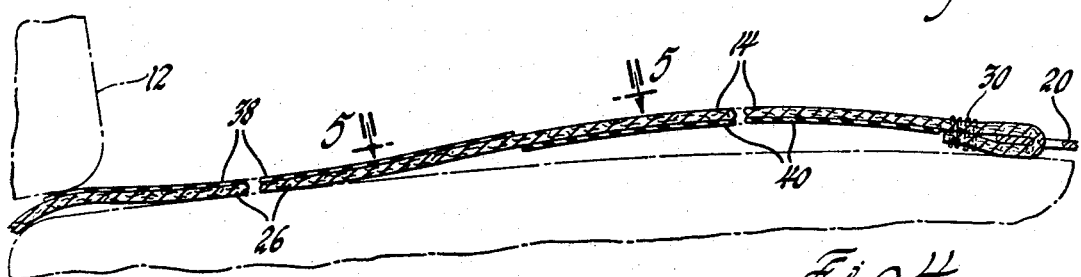
FIGURE 4 is a sectional view of an alternate embodiment of the safety seat belt of this invention.

The embodiment shown in FIGURE 4 is substantially the same as that shown in FIGURE 3 with the exception that the elastic portions 38 and 40 are placed on opposite exterior sides of the fabric 26 rather than being woven therein. This embodiment is merely an alternate way of accomplishing the same result obtained in the FIGURE 3 embodiment.

Another alternate embodiment is shown in FIGURES 6 and 7 which also show in more detail a method of attaching a belt 14 to the floor pan 16. This anchorage includes a U-shaped clamp 42 into which a bracket 44 is inserted. A bolted assembly 46 passes through the clamp 42 and the bracket 44 and secures them to the floor pan 16. The belt 14 is attached to the bracket 44 by passing through an aperture 48 therein and being sewn to itself at 50. The belt 14 in the FIGURES 6 and 7 embodiment also is comprised of a fabric material 52. The main distinction in this embodiment as compared to the preceding embodiment is that four separate elastic members 54, 56, 58 and 60 are used instead of just two. The pair of elastic members 54 and 56 are longitudinally adjacent to each other and near opposite sides of fabric 52 as are the pair of elastic members 58 and 60. The result of this configuration of elastic members is a double roll of the belt as shown in FIGURE 7. In this embodiment the lock plate 20 also remains on the outside of the wound-up seat belt.

Figure 5:
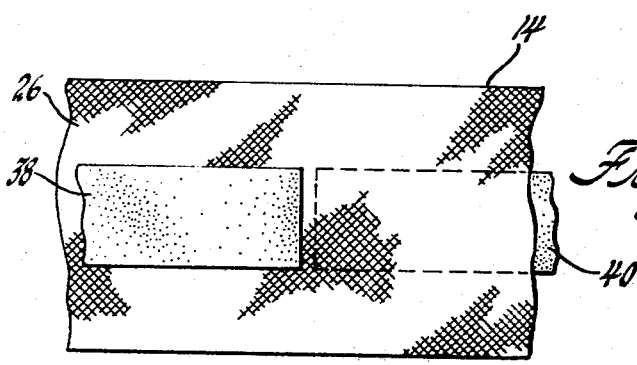
FIGURE 5 is a plan view taken in the plane of lines 5—5 in FIGURE 4.

Thus, it can be seen that this invention provides a seat belt which can be used in the normal manner to hold a passenger in a vehicle seat and which is self-retracting when not in use. It should be noted that although the invention has been shown such that the seat belt retracts itself into a roll near the back of the seat, it would be possible to mount the belt on the side of the seat and the seat belt would then retract itself into a roll adjacent to the mounting location rather than near the back of the seat. It should also be clear that the subject invention would be applicable to the belt 22 connected to the belt buckle 24. In this situation, due to the extra weight of the heavier buckle as compared to the latch plate, it probably would be necessary to manually lift the buckle 24 and start it in the retracting direction. It should also be clear that the elastic members in FIGURES 6 and 7 embodiment could be placed on the surface of the fabric 52 as was done in the FIGURES 4 and 5 embodiment.

Although but three embodiments of the subject invention have been described and shown in detail, it should be clear to those who are skilled in the art to which the invention pertains that many changes and modifications may be made thereto without departing from the scope of the invention.

I claim:

A self-retracting seat belt comprising, in combination, a strap of nonelastic material, means adjacent one end of the strap for securing the strap to anchor means, means adjacent the other end of the strap for releasably securing the strap to a member to provide a seat belt assembly for encircling a person, a pair of elastic members extending longitudinally of the strap and having adjacent ends located in spaced relationship to each other and separated by a portion of the strap, said elastic members being disposed within the strap and adjacent opposite sides thereof, means securing the elastic members to the parts of the strap located to each side of the separating portion thereof, the elastic members being oppositely prestressed and folding the strap upon itself into spiral form when the other end of the strap is released, the portion of the strap separating the elastic members being located at the core of the spiral form and the parts of the strap to which the elastic members are secured providing the coils of the spiral form.

References Cited by the Examiner

UNITED STATES PATENTS

| | | | |
|---|---|---|---|
| 2,192,101 | 2/1940 | Peskin | 297—388 X |
| 2,826,523 | 3/1958 | Blaszkowski et al. | 161—46 |
| 3,042,742 | 7/1962 | Foster | 297—388 X |
| 3,163,467 | 12/1964 | Deneau | 297—388 |
| 3,243,232 | 3/1966 | Blaszkowski | 297—388 |

CASMIR A. NUNBERG, *Primary Examiner.*